(No Model.) 2 Sheets—Sheet 2.
C. L. CLARKE.
PORTABLE ELECTRICAL GAS LIGHTING APPARATUS.
No. 324,009. Patented Aug. 11, 1885.

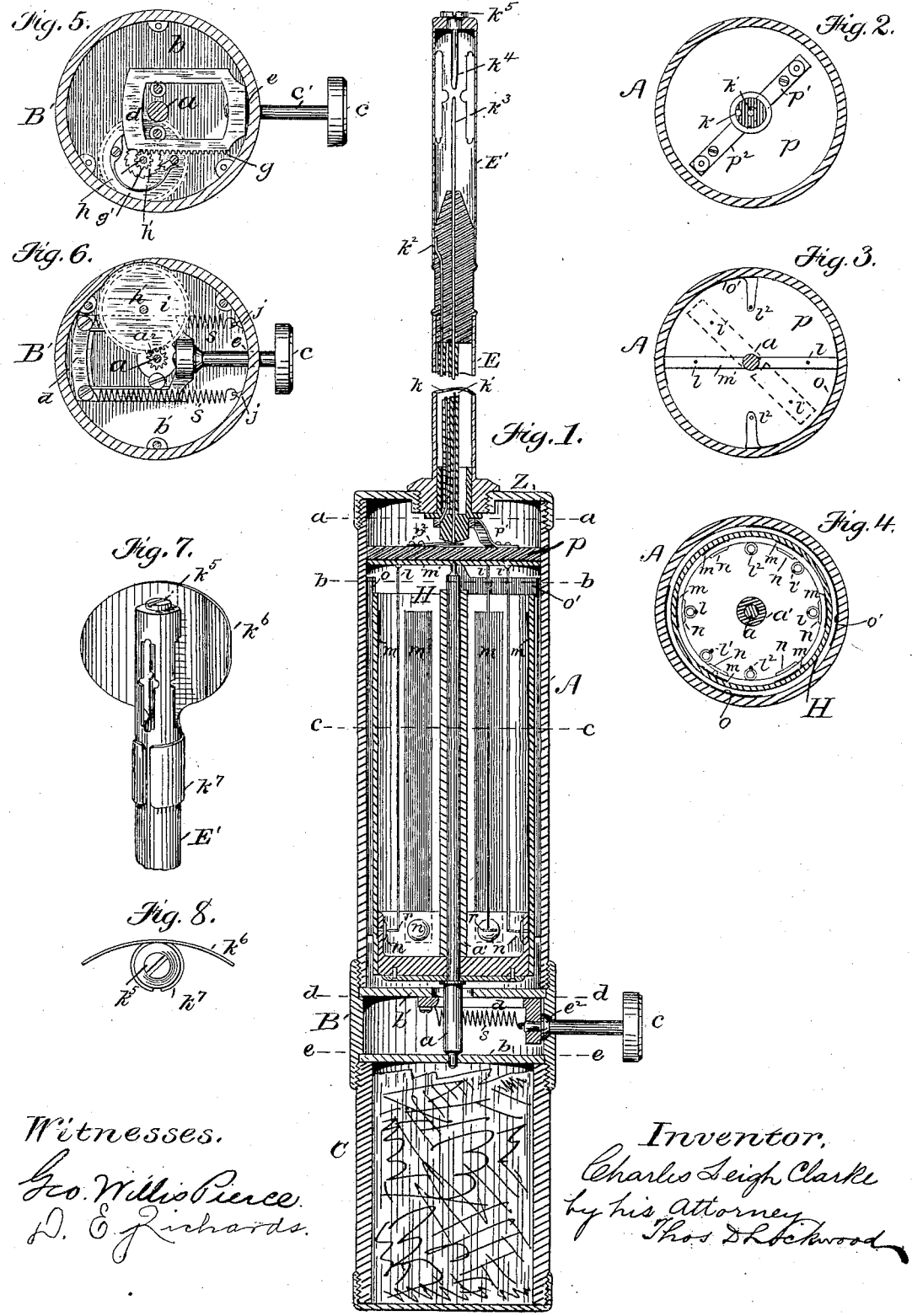

Witnesses.
Geo Willis Pierce
D. E. Richards.

Inventor:
Charles Leigh Clarke
by his Attorney
Thos. D. Lockwood

UNITED STATES PATENT OFFICE.

CHARLES L. CLARKE, OF MANCHESTER, COUNTY OF LANCASTER, ENGLAND, ASSIGNOR TO THE DOMESTIC ELECTRICAL MANUFACTURING COMPANY, OF BOSTON, MASSACHUSETTS.

PORTABLE ELECTRICAL GAS-LIGHTING APPARATUS.

SPECIFICATION forming part of Letters Patent No. 324,009, dated August 11, 1885.

Application filed July 12, 1884. (No model.) Patented in England December 31, 1883, No. 5,992; in France May 19, 1884, No. 16,227; in Belgium May 20, 1884, No. 65,211; in Italy July 18, 1884, No. 17,143; in Spain November 20, 1884; in Austria-Hungary November 21, 1884, and in Germany May 8, 1885.

*To all whom it may concern:*

Be it known that I, CHARLES L. CLARKE, of Manchester, in the county of Lancaster, England, have invented certain Improvements in Portable Electrical Gas-Lighting Apparatus, (for which Letters Patent No. 5,992, dated December 31, 1883, were granted in Great Britain,) of which the following is a specification.

This invention relates to, and constitutes an improvement in, portable gas-lighting apparatus. Its object is to provide a convenient, durable, and portable instrument for generating and utilizing electricity for lighting inflammable gases or vapors, and for various other purposes—such, for instance, as the firing of explosive charges in mining operations or for torpedo or artillery work.

My object is attained in the apparatus which I shall hereinafter describe, and which consists, generally, in an inductive generator combined with mechanism to operate the same, and conducting wires and electrodes contained in a convenient tube, whereby the electricity generated is conducted to any suitable distance for the purpose of applying it to its designed purpose. In addition to these elements, I also provide a drying-cell, inclosing a drying substance, whereby the interior receptacle of the mechanism is kept perfectly dry and its effectiveness greatly increased.

To produce or develop the electricity necessary for the accomplishment of the purposes specified, I preferably employ a generating device in which an electrified body is made to act by induction on a movable system in such a way as to produce a practically-continuous generation of electricity, which is discharged between the extremities or points of the conducting-electrodes. By utilizing such a source of high-tension electricity I am enabled to dispense with the costly and unenduring adjuncts of electric gas-lighting—i. e., a voltaic battery, induction-coil, and circuit-breaker—which have heretofore been indispensable.

Figure 11:
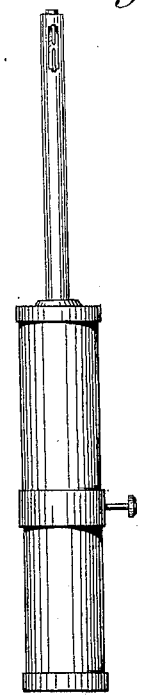
Figure 9:
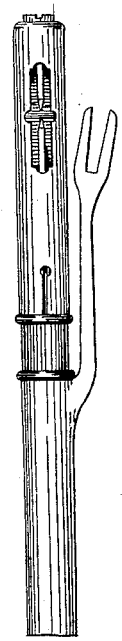
Figure 10:
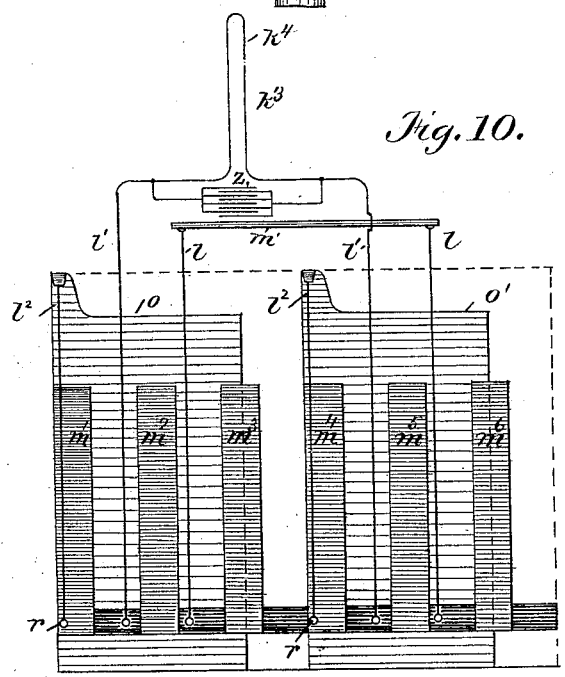

In the annexed drawings, which form a part of this specification, Figure 1 is a vertical section of the complete apparatus with the electrode-containing tube partly broken away and shortened. Fig. 2 is a cross-sectional plan view on the line *a a*, looking down; Fig. 3, a cross-section on the line *b b*, looking up; Fig. 4, a cross-section on the line *c c*, looking down. Fig. 5 is a cross-section on the line *d d*, looking down; Fig. 6, a cross-section on the line *e e*, looking up, all of the said cross-sections referring to Fig. 1. Fig. 7 is a perspective view of the detachable end of the electrode-tube, and contains one of the electrode terminals. Fig. 8 is a view of the end of the lighting-tube and gas-screen. Fig. 9 shows the end of the lighting-tube fitted with a wrench attachment for turning gas-cocks. Fig. 10 is a diagrammatic view on Mercator's projection of the electrical connections of the inductive generator, and Fig. 11 is an external elevation of the improved instrument as it appears without the wrench or screen attachments.

The entire apparatus, comprises four distinct parts or elements—viz., the inductional generative apparatus, the lighting-tube containing the conducting-wires and operative points, the actuating mechanism suitably incased and furnished with means for operating from the outside, and the drying-cell charged with some drying substance or compound. These separate instrumentalities I design, however, to incorporate in a single instrument in the manner described in Letters Patent issued to Charles L. Clarke and John Leigh, July 25, 1882, No. 261,677.

The inductive generating apparatus, which constitutes one of the principal elements of my invention, is specifically shown in Figs. 1, 2, 3, 4, and 10, and is based partly upon Varley's electrostatic machine and partly upon the "mouse-mill" of Sir William Thomson. It consists, mechanically, of a hollow cylinder of non-conducting material—such as vulcanite—mounted delicately upon pivots or journals within another, and caused by proper mechanism to rotate rapidly therein.

Inasmuch as it is very difficult to clearly show in the drawings the electrical arrangements, I have in Fig. 10 endeavored to show them by supposing the cylinders to be split open and rolled out so as to present a flat appearance.

In the drawings, A is the outside vulcanite cylinder, which also constitutes the external casing, and which is closed at the upper end by a partition, $p$, of like material, through which the conducting-wires extend, terminating in contact-springs $p'$ and $p^2$. The wall of this cylinder, however, extends upward a little above the cover, and is threaded for the attachment of the lighting-tube or the base-plate Z thereof. Two armatures or inductors, $o$ and $o'$, of thin metal foil, are fastened to the internal surface of the cylinder opposite one another, each equaling in width about one-third of the internal circumference of the cylinder. Six contact-springs, each consisting of a wire bent to a circular form at its free extremity, are permanently attached at one end to the closed end of the outer cylinder, A. These are arranged in three pairs, $l$, $l'$, and $l^2$. The springs $l$, at their fixed end, are fastened to the opposite ends of a light metal bar, $m'$, which is let into the cover $p$ of the cylinder, so that from the free end of one of the springs $l$ to the free end of the other there is a continuous conducting-path. The springs $l'$, at their fixed ends, are permanently united to the electrode contact-springs $p'$ and $p^2$, and provide the route for the escape or neutralization of the electricity. The springs $l^2$ are each connected to the projecting end or terminal of one of the inductor-armatures $o$ and $o'$.

The inner hollow cylinder, H, has an axis, $a$, extending through it from one end to the other, terminating at both ends in an arbor or journal by which the cylinder is rotatable in suitable fixed bearings, the upper bearing being the center of the metal bar $m'$, while the lower is in the lower cover, $b$, of the metal motor-case, which I shall hereinafter describe. The cylinder H is provided with six metal foil carriers or conductors, $m$, each carrier being a strip of foil extending nearly the whole length of the cylinder and having a width of about three-eighths of an inch. If preferred, the carriers may be supported upon disks at each end. These are preferably cemented to the interior surface of the cylinder, and terminate at the lower end in a series of metal buttons or studs, $n$, which project for a short distance into the cylinder through the flange of the rubber base-plate. The carriers $m$ have no electrical connection with one another or with the electrodes or inductors $o$ except by means of the curved ends $r$ of the contact-springs $l$, which are each brought into successive contact with the carrier-buttons $n$. When the cylinder H is revolved, each carrier $m$ is thus brought into successive contact through the contact-springs $l$ with the armatures, the electrode-wires, and the short-circuiting bar $m$. The shaft or axis $a$, passing through the inner cylinder, H, is insulated from contact with any electrical surface by the sleeve $a'$, which protects it from contact except at its ends, one of which is centered in the metal bar $m'$, while the other end is also at its bearing in contact with the metal work of the actuating mechanism.

The lighting-tube E and the wires and electrodes contained therein and attached thereto constitute practically a continuation of the inductive apparatus.

The outside tube may be of brass or any suitable metal or alloy, and contains two wires, $k$ and $k'$, insulated from one another and from the tube. The central wire, $k'$, at its lower end, makes contact with the contact-spring $p^2$, which terminates the wire spring $l$, and passing through the tube terminates at its upper extremity in a spark point or electrode, $k^3$. The other wire, $k$, at the base of the tube E, terminates in a metal ring, which, when the tube is screwed into place, comes into contact with the flat spring $p'$, this spring being permanently connected with the wire spring $l'$. The wire $k$, passing through the tube, is brought to the side and caused to project through its non-conducting covering at the point $k^2$. A metal cap, E', (shown in detail by Fig. 7,) is adapted to slide over the top of the tube, and its substance is brought into contact with the end $k^2$ of the wire $k$, which is thus practically extended through the substance of the cap and brought to a point, $k^4$, opposite and complementary to the point $k^3$ of the other wire. Between these points, when the apparatus is operated, sparks freely pass.

The point $k^4$ may consist of an adjustable screw, $k^5$, by which the distance between the points can be controlled.

I sometimes find it desirable to add the screen $k^6$, which can be attached by the sleeve $k^7$, which fits on the cap E'. The purpose of this is to guide the gas more directly upon the spark-points.

The lighting-tube E screws into the metal cover Z, which in turn screws onto the outer vulcanite cylinder, A.

I find it in some cases desirable to introduce a condenser, $z$, between the two electrode-wires $k$ and $k'$, as indicated in the diagram Fig. 10. This can readily be inclosed in the lighting-tube E in a manner well understood by rolling sheets of tin-foil between sheets of paraffined paper.

I will now describe the actuating mechanism of the induction apparatus, which is separately inclosed in a metal compartment, B, which is screwed to the cylinder A and also to the drying-chamber G, forming a connecting-link between them.

In addition to the parts shown in Fig. 1, the mechanism is also illustrated by Figs. 5 and 6. The spindle or axis $a$ of the inner cylinder, as hereinbefore stated, passes through the cylinder B, passing loosely through the upper partition, $b'$, and centering at its end in the lower plate, $b$. A pinion, $a^2$, is fixed to the spindle $a$, as shown in Fig. 6. This pinion is engaged by the spur-wheel $i$, and a second pinion, $g'$, on the arbor $h$ of the spur-wheel, gears with the rack $g$ carried on the movable frame $d$, this frame being attached to and actuated by the push-button $c$, the shank of which, $c'$, passes through a hole in the casing B. The part $e^2$ at the interior surface of the hole is fitted with a valve-seating, so that when the button is retracted the whole is air-tight. The spur-wheel works loose on the arbor $h$, and is maintained in mechanical connection with the said arbor and pinion $g'$ when the button $c$ and movable rack-frame $d$ are being pushed inwardly by the ratchet and pawl $h'$. When, however, the pressure is removed from the push-button $c$, the said button and its spindle are retracted by the spiral springs $s$, which are fastened to a fixed point, $j$, on the interior peripheral surface of the metal casing B. When so retracted, the pawl slides backward over the ratchet-teeth, so that all backward movement of the cylinder H is prevented.

The inner cylinder, H, of the induction-machine is by this actuating mechanism readily revolved at the requisite speed by simple pressure of the thumb upon the button $c$, which, as soon as the pressure is removed, is automatically retracted by the reaction of the springs $s$.

The only undescribed part of the instrument is that which forms the base of the handle—viz., the chamber G. This is formed of any convenient material, and is adapted to screw into the chamber B. It is used as a drying-cell, and is filled with blotting-paper or muslin or other textile fabric, permeated or saturated with chloride of calcium or other similar drying or absorbent substance or compound. In the climate of many of the United States this element is not indispensable, and I have found by experience that as a general thing the instrument works perfectly well when the drier is omitted; but in countries of humid climate, such as England and the Southern States, I prefer to use the drying-cell in combination with the other elements.

Having now described the construction of the apparatus, I will describe the method in which it operates.

When the instrument is to be used, the button $c$ is to be pressed by the thumb or fingers, while at the same time the electrodes at the end of the lighter are directed to the point where the gas, vapor, or other inflammable compound is to be ignited. The actuating mechanism is thus caused to rotate the cylinder H rapidly, and electricity is developed in the following manner: The inductors or armatures $o$ and $o'$ may be regarded as having always a somewhat different potential, so that one practically has a slight positive and the other a small negative charge. It is, in fact, found to be difficult, if not impossible, to reduce them to the same potential, and as the smallest conceivable charge on one inductor of the machine is sufficient to start it, after a few revolutions of the inner cylinder the inductors and carriers become highly charged, and discharge themselves by means of the electrodes. Although it is, as explained, very difficult and almost impossible to discharge the apparatus totally, it is conceivable that such a condition may occur in consequence of protracted exposure to a damp atmosphere or from other causes. If it is any time found that the instrument is discharged, it may readily be re-excited by simply rubbing the outside case, which, as hereinbefore indicated, is made of vulcanite, ebonite, or some similar dielectric, with a silk cloth or a similar substance. Referring now to the diagram Fig. 10, we may assume, therefore, the armature or inductor $o$ to have a small initial charge of electricity—say positive. The cylinder H, carrying on its interior surface the foil-carriers $m$, is supposed to be revolving in the direction of the arrow. The inductor $o$ will induce a negative charge through the substance of the revolving cylinder in the carrier $m^2$ as the said carrier rotates past the contact-spring $l$. The carrier makes momentary contact with the round head $r$ of the said spring, and the positive electricity flows by way of the contact-spring $l$, metal bar $m^2$, and complementary spring $l$ on the other side of said bar to the opposite carrier, $m^5$, charging it positively. Since the metal bar $m'$ is also in contact with the earth through the journal and arbor of the cylinder, the actuating mechanism, and the fingers of the operator, it may also be said that a portion of the original positive charge of the carrier $m^2$ flows to earth. The negative charge of the carrier $m^2$ is, by the continued rotation of the cylinder H, conveyed onward until the next contact-spring, $l^2$, is reached, and the round end $r$ of that spring, impinging on the carrier, conducts the said charge away to the second inductor, $o'$, augmenting the original negative charge and leaving the carrier $m^2$ almost neutral. As the said carrier continues to rotate past the inductor $o^2$ a positive charge is induced in it, and what negative charge there is remaining flows off by the second contact-spring, $l$, which by this time is reached. Still passing on, the positive charge in $m^2$ is brought to the first inductor, $o$, and as the carrier makes contact with the round end $r$ of the spring $l^2$ the said charge is transferred to the inductor, augmenting the original positive charge existing therein. When the same carrier, $m^2$, again passes the first spring of the pair, $l$, it receives by induction from the inductor $o$ through the substance of the cylinder H a greater negative charge than before, which again is carried on to augment the negative charge in the inductor $o'$, this inducing a strong positive charge in the carrier $m^2$ as it passes that inductor, which charge is for the second time added to that in the first inductor, $o$. Each turn thus augments the charge on both inductors in a constantly-increasing ratio; and the only limit to the charge which can thus be accumulated on the inductors is that determined by the third pair of contact-springs, $l'$, leading to the wires which pass through the lighting-tube and end in the sparking-points $k^3$ and $k^4$; and when the difference of potential between the inductors becomes sufficiently great the electricity, instead of continuing to augment the charges of the inductors, is delivered by the carrier to the contact-springs $l'$, and passing up the wires $k$ and $k'$ recombines in the form of sparks, which pass in a continuous supply between the points $k^3$ and $k^4$, the condenser $z$ aiding in the effectiveness of the sparks.

I have merely described the operation of one of the carriers, but it is very evident that the same succession of electrical changes is continually occurring in all of them, the whole working harmoniously together, first to excite the inductors to their maximum capacity, and then to conduct the surplus electricity by way of the sparking-points.

It is evident that the arrangement which I have described may be reversed, the inductors being placed on the inner revolving cylinder and the carriers on the outer cylinder, without departing from my invention.

It is also evident that the details of the actuating mechanism may be greatly varied without departing from the spirit of my invention, which in this particular merely requires any mechanism which by manual pressure on a button tends to rapidly rotate the inner cylinder.

By utilizing such an electrostatic generator and arranging it in the manner described in the handle of the electric torch or gas-igniter, the leading-out wires being inclosed or combined with the lighting-tube attached to said handle, I am enabled to form a gas-lighting instrument of great efficiency, cleanliness, and durability, which is also characterized by extreme lightness, portability, and by absolute freedom from obnoxious acids or chemicals, and consequent cleanliness. I make no claim herein to the invention of the electrostatic generator which I have described, since I intend that the said generator shall form the subject of a separate application for Letters Patent.

Having now fully described my invention, I claim—

1. An electric gas-lighting apparatus consisting of an inductive generator of electricity, a motor mechanism to revolve the moving parts thereof, an actuating push-button for the said motor, and disconnecting-gear adapted to release the said motor from the control of the push-button after a single impulse, whereby a protracted operation of the generator may be developed from a single motive impulse, together with igniting points or electrodes connected by means of suitable conductors with the said generator, whereby sparks may be produced in a continuous stream and be directed to any desired point, substantially as described.

2. A portable electrical gas-igniting apparatus consisting of an inductive generating-machine, conducting wires and electrodes therefor, an actuating mechanism for the said machine, and a drying-chamber filled with a textile fabric impregnated with chloride of calcium or similar compound, the generating device, actuating mechanism, and drying compound being inclosed in the handle of the instrument in the manner specified, and the said actuating mechanism being provided with a starting knob or button, the shank of which passes through the casing, but which is itself fixed upon the outside thereof, whereby the same hand that grasps the handle may operate the generator.

3. A portable electrical gas-igniting apparatus or electric torch consisting of a rotary inductive generator of high-tension electricity, conducting wires and electrodes for said generator inclosed in a tube of desired length, an actuating mechanism for the said generator adapted to be manually operated from the outside, and provided with a push-button whereby the mechanism may be actuated to rotate the generator-cylinder, and an inclosing-case formed of vulcanite or similar dielectric divided into separate compartments, one of which serves to inclose the motor mechanism, while the other serves to inclose the generator and also constitutes the outer cylinder of said generator, the entire case being also adapted to serve as a handle for the complete lighting apparatus, substantially as described.

4. An electric torch for igniting gas or inflammable vapor, consisting of the combination in a single case or handle of an inductive generating device, an actuating mechanism therefor adapted to be operated by the same hand that carries the torch, leading-out wires inclosed in an extension-tube and terminating in spark-points, a condenser interposed between the said wires, and a chamber filled with a suitable drying or absorbent substance whereby the interior of the apparatus is maintained perfectly dry and the efficiency of the instrument insured.

5. An electric gas-lighting apparatus consisting of four detachable sections adapted to be screwed together to form one portable instrument, one section composed of a tube inclosing the terminal wires, sparking-points, and a condenser, the second section inclosing an electrostatic inductive generating device, the third an actuating mechanism for the said induction-machine, capable of being set in action from the outside by means of a press-button projecting through the casing, and the fourth section comprising a drying-chamber inclosing textile fabric or blotting-paper impregnated with calcic chloride, substantially as described.

6. The combination, with the lighting-tube E of a portable electrical gas-igniting apparatus, of the detachable cap-piece $E'$, carrying the screen $k$, for the purposes described.

7. In a portable electric gas-igniting apparatus, an electrostatic inductive generating device of cylindrical form comprising an outer cylinder of ebonite or similar material supporting armatures or inductors of metal foil, an inner cylinder of like material adapted to rotate on bearings or pivots and supporting carriers of metal foil, contact-springs whereby the charges induced upon the said carriers are redistributed, and means, as indicated, whereby one of the said cylinders may be rotated with reference to the other, conducting wires and electrodes inclosed in a tube of suitable length, whereby the disruptive discharges of the generator when operated may be directed to the required point, and an inclosing-case for the working parts constituting a handle for the lighter, a portion of which case incloses the motor mechanism, while a second portion constitutes the outer cylinder of the generator.

In testimony whereof I have signed my name to this specification, in the presence of two subscribing witnesses, this 24th day of May, 1884.

CHAS. L. CLARKE.

Witnesses:
W. H. VAUDREY,
JNO. HUGHES.